US010599483B1

(12) United States Patent
Padisetty et al.

(10) Patent No.: US 10,599,483 B1
(45) Date of Patent: Mar. 24, 2020

(54) DECENTRALIZED TASK EXECUTION BYPASSING AN EXECUTION SERVICE

(71) Applicant: Amazon Technologies, Inc., Seattle, WA (US)

(72) Inventors: Sivaprasad Venkata Padisetty, Bellevue, WA (US); Matthew Adam Ford, Seattle, WA (US); Patrick McFalls, Seattle, WA (US); Amjad Hussain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/446,927

(22) Filed: Mar. 1, 2017

(51) Int. Cl.
*G06F 9/48* (2006.01)
*G06F 9/50* (2006.01)
*G06F 9/54* (2006.01)

(52) U.S. Cl.
CPC .......... *G06F 9/5083* (2013.01); *G06F 9/4881* (2013.01); *G06F 9/4843* (2013.01); *G06F 9/505* (2013.01); *G06F 9/5027* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 5,596,750 A * | 1/1997 | Li | G06F 9/466 707/999.104 |
| 6,148,323 A | 11/2000 | Whitner et al. | |
| 6,389,446 B1 * | 5/2002 | Torii | G06F 8/45 718/100 |
| 6,470,375 B1 | 10/2002 | Whitner et al. | |
| 6,757,897 B1 * | 6/2004 | Shi | G06F 9/4843 710/240 |
| 6,993,763 B2 * | 1/2006 | Hayes, Jr. | G06F 9/5038 718/102 |

(Continued)

OTHER PUBLICATIONS

"Amazon EC2 Run Command Components and Concepts," Amazon. com, undated. PDF retrieved on Feb. 23, 2017 from: docs.aws. amazon.com/AWSEC2/latest/WindowsGuide/run-command-concepts. html, pp. 1-4.

(Continued)

*Primary Examiner* — Abu Zar Ghaffari
(74) *Attorney, Agent, or Firm* — Robert C. Kowert; Kowert, Hood, Munyon, Rankin & Goetzel, P.C.

(57) ABSTRACT

Methods, systems, and computer-readable media for decentralized task execution that bypasses a task execution service are disclosed. A connection is established over one or more communication channels between a task execution interface and agent software of a compute instance. The agent software is executable to receive task execution documents from a task execution service and initiate local task execution based (at least in part) on the task execution documents. A task execution document is sent from the task execution interface to the agent software over the one or more channels. In sending the task execution document from the task execution interface to the compute instance, the task execution service is bypassed. Execution of one or more tasks is initiated on the compute instance by the agent software based (at least in part) on the task execution document.

16 Claims, 13 Drawing Sheets

(56) References Cited

U.S. PATENT DOCUMENTS

| | | | | |
|---|---|---|---|---|
| 7,600,229 | B1* | 10/2009 | Shmuylovich | G06F 9/505 718/104 |
| 7,624,163 | B2* | 11/2009 | Kramer | G06F 9/5066 709/208 |
| 7,822,862 | B2* | 10/2010 | Slater | G06F 11/3433 709/229 |
| 7,856,013 | B2* | 12/2010 | Brewer | H04L 47/122 370/389 |
| 7,877,440 | B2* | 1/2011 | Tock | H04L 51/00 709/203 |
| 7,937,437 | B2* | 5/2011 | Fujii | G06F 9/505 709/203 |
| 8,260,940 | B1* | 9/2012 | Vosshall | H04L 67/16 709/228 |
| 8,296,786 | B2* | 10/2012 | Faust | G06F 9/547 709/202 |
| 8,341,732 | B2* | 12/2012 | Croft | G06F 3/1415 726/21 |
| 8,903,943 | B2* | 12/2014 | Glaser | G06F 9/5027 709/217 |
| 8,930,705 | B1 | 1/2015 | Ghose et al. | |
| 8,970,876 | B2* | 3/2015 | Takahashi | G06F 9/5027 358/1.15 |
| 9,183,347 | B1* | 11/2015 | Paxson | G16B 5/00 |
| 9,329,937 | B1* | 5/2016 | Grant | G06F 11/14 |
| 9,507,634 | B1* | 11/2016 | Shawver | G06F 9/4881 |
| 9,529,922 | B1* | 12/2016 | Wahi | H04L 67/42 |
| 9,678,789 | B2* | 6/2017 | Meijer | H04N 21/23103 |
| 9,946,577 | B1* | 4/2018 | Stafford | H04L 67/10 |
| 2004/0015968 | A1* | 1/2004 | Neiman | G06F 9/4843 718/100 |
| 2004/0098447 | A1* | 5/2004 | Verbeke | G06F 9/5055 709/201 |
| 2004/0148610 | A1* | 7/2004 | Tsun | G06F 9/4843 719/316 |
| 2007/0100698 | A1* | 5/2007 | Neiman | G06Q 30/02 705/14.46 |
| 2008/0256245 | A1* | 10/2008 | Parmar | H04L 67/2842 709/228 |
| 2009/0049443 | A1* | 2/2009 | Powers | G06F 9/505 718/100 |
| 2010/0007713 | A1* | 1/2010 | Yamamoto | H04N 7/152 348/14.08 |
| 2010/0287377 | A1* | 11/2010 | Lim | G06F 21/6218 713/176 |
| 2011/0161691 | A1* | 6/2011 | Tatsumi | G06F 1/26 713/300 |
| 2012/0042003 | A1* | 2/2012 | Goetz | G06F 9/5066 709/203 |
| 2012/0209947 | A1* | 8/2012 | Glaser | G06F 9/5027 709/217 |
| 2012/0311603 | A1* | 12/2012 | Kudo | G06F 3/0611 718/105 |
| 2013/0031252 | A1* | 1/2013 | Chang | H04L 69/40 709/225 |
| 2013/0179947 | A1* | 7/2013 | Kline, III | H04L 67/28 726/4 |
| 2014/0115596 | A1* | 4/2014 | Khan | G06F 9/5011 718/104 |
| 2015/0095917 | A1* | 4/2015 | Challenger | G06F 9/4843 718/104 |
| 2015/0121280 | A1* | 4/2015 | Slatner | G06Q 10/10 715/772 |
| 2016/0337732 | A1* | 11/2016 | Al-Walaie | H04B 10/032 |
| 2017/0222811 | A1* | 8/2017 | Claes | H04L 63/123 |
| 2017/0272794 | A1* | 9/2017 | Scurtu | H04N 21/2541 |
| 2018/0324209 | A1* | 11/2018 | Zhang | H04L 63/0892 |

OTHER PUBLICATIONS

Jeff Barr, "EC2 Run Command Update—Hybrid and Cross-Cloud Management," Amazon.com, Jul. 2016. PDF retrieved on Feb. 23, 2017 from: ://aws.amazon.com/blogs/aws/ec2-run-command-update-hybrid-and-cross-cloud-management/, pp. 1-5.

* cited by examiner

DECENTRALIZED TASK EXECUTION BYPASSING AN EXECUTION SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources.

Figure 1:
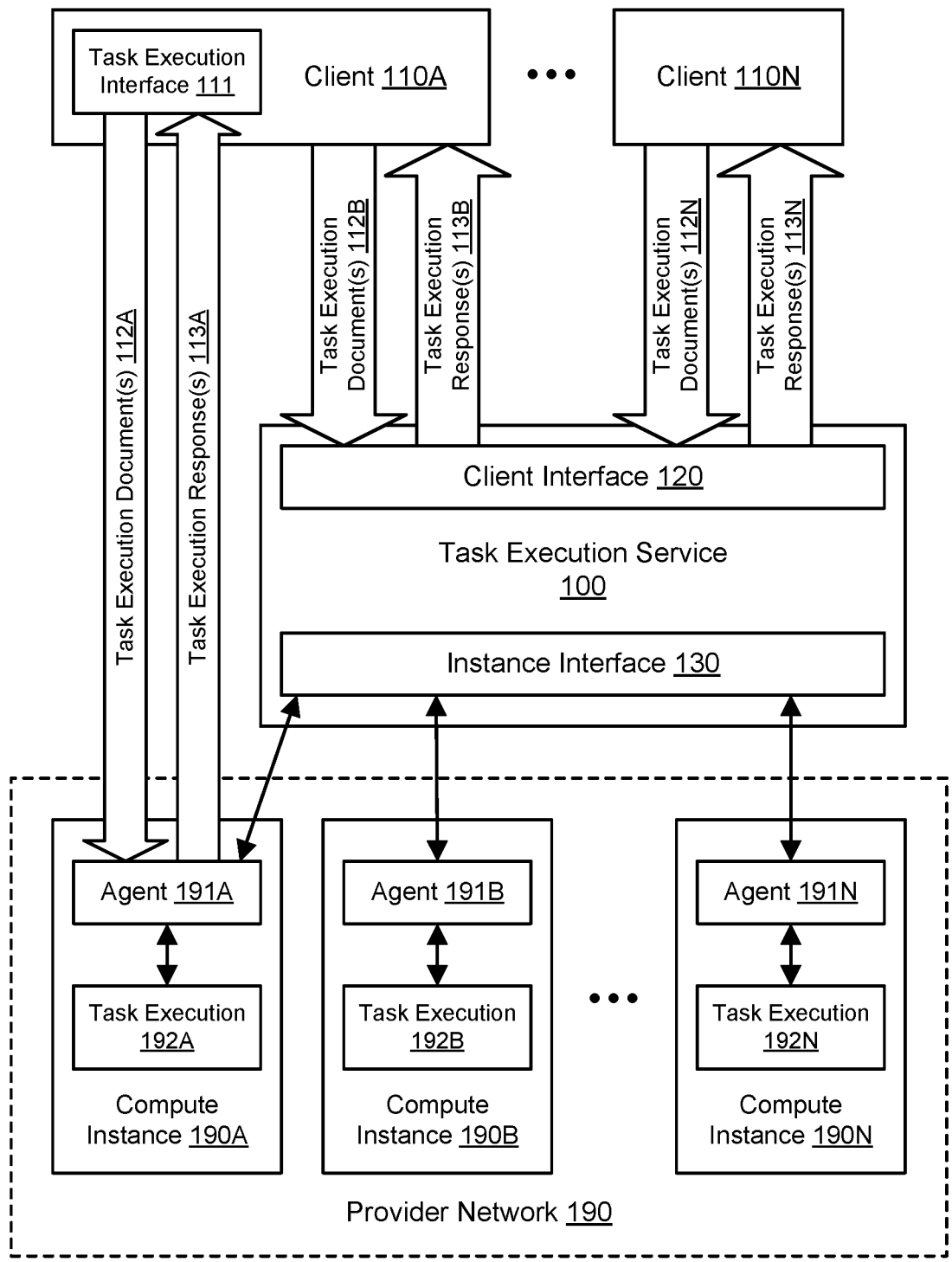
FIG. 1 illustrates an example system environment for decentralized task execution that bypasses a task execution service, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for decentralized task execution that bypasses a task execution service are described. Using the techniques described herein, task execution may be initiated on a compute instance in a manner independent of a task execution service. The task execution may be initiated using a task execution interface resident on a computing device. The computing device with the task execution interface may be separate and distinct from one or more computing devices that implement the task execution service. The compute instance used for task execution may include agent software associated with the task execution service. The agent software may be executable to receive task execution documents (also referred to as task definitions) from the service, oversee task execution on the instance based (at least in part) on the documents, and return any results and/or status updates. The task execution interface may establish a connection with the same agent software over a network and send a task execution document to the instance using the connection, while bypassing the service. A task execution document may reference or otherwise describe one or more tasks to be executed, potentially along with arguments or other input for the task(s). Task execution documents submitted using the task execution interface may share the same document format and may be executed in substantially the same manner as task execution documents submitted using the task execution service. The task execution interface may allow users to continue executing tasks on their instances even when problems arise with the service. For example, when the task execution service is unavailable (e.g., due to failure or overloading of the service or a network outage), the task execution interface may contact one or more compute instances directly and without using the service as an intermediary. As another example, if one or more compute instances are not reachable by the service but are reachable by the task execution interface (e.g., the instances are on a private network and not connected to the Internet), then the service may similarly be bypassed. The interface may also be used to provide task documents directly to instances for testing and debugging purposes. In this manner, initiation of task execution may be decentralized and made more robust, e.g., in a single-tenant or multi-tenant provider network that offers access to compute instances.

FIG. 1 illustrates an example system environment for decentralized task execution that bypasses a task execution service, according to one embodiment. A task execution service 100 may provide remote management and/or automation of task execution on compute instances or other computing resources in a centralized and/or structured manner. In one embodiment, the task execution service 100 may implement aspects of the Run Command, also referred to as Amazon EC2 Run Command, offered by Amazon Web Services (AWS). Using the task execution service 100, a client may remotely and securely manage "on premises" computing resources running in the client's data center, "cloud" computing resources (e.g., virtual compute instances) running on a cloud-based computing platform (e.g., Amazon Elastic Compute Cloud [EC2]), or computing resources both on premises and in the cloud. Through a unified interface, the task execution service 100 may be used to manage a diverse range of computing resources, including virtual compute instances and/or physical compute instances on a variety of platforms. The task execution service 100 may provide a simple way of automating common administrative tasks such as executing Shell scripts and commands on instances with a Linux operating system, running PowerShell commands on instances with a Windows operating system, installing software or patches, and so on. The task execution service 100 may allow a client to execute such tasks across multiple instances while also providing visibility into the results and enabling management of configuration change across fleets of instances. The task execution service 100 may offer various features for ease of instance management. In one embodiment, the task execution service 100 may include access control through integration with AWS Identity and Access Management (IAM) or any other suitable access control mechanism, e.g., to apply granular permissions to control the actions that users can perform against instances. In one embodiment, actions taken with the task execution service 100 may be recordable (e.g., using AWS CloudTrail) to enable clients to review and audit changes throughout their compute environments.

The task execution service 100 may include a client interface 120 permitting interaction between the service and one or more clients 110A-110N. Using the client interface 120, the task execution service 100 may receive various types of data, metadata, and instructions from clients 110A-110N, such as configuration requests, invocations of service functionality, and task execution documents (or selections thereof) to be executed on instances. As shown in the example of FIG. 1, the client interface 120 may receive task execution documents 112B from client 110A and task execution documents 112N from client 110N. In one embodiment, the task execution documents 112B-112N may be referenced or specified by the clients 110A-110N in a user interface presented by the service 100 and loaded from any suitable location, potentially including locally accessible storage of the service 100 itself. Although clients 110A-110N (and their corresponding task execution documents) are shown for purposes of illustration and example, it is contemplated that any suitable number and configuration of clients may be used with the service 100. The task execution documents 112B-112N may be specified or received by the service 100 through any appropriate client interface 120, potentially including an application programming interface (API) or other programmatic interface, a command-line interface (CLI), a graphical user interface (GUI), and/or suitable forms of interfaces. Using the client interface 120, the task execution service 100 may send various types of data and metadata to clients 110A-110N, such as results of configuration requests, acknowledgements of invocations of service functionality, and results and status updates associated with task execution documents. As shown in the example of FIG. 1, the client interface 120 may optionally send such task execution responses 113B to client 110A and task execution responses 113N to client 110N. The task execution responses 113B-113N may be marshaled by the service 100 from the execution of task execution documents 112B-112N on one or more computing resources associated with the client, e.g., one or more of a set of compute instances 190A-190N. The client interface 120 may be part of a proprietary messaging infrastructure.

The task execution service 100 may also include an instance interface 130 permitting interaction between the service and one or more compute instances or other computing resources. The instance interface 130 may interact with agent software resident on the compute instances and associated with the task execution service 100. As shown in the example of FIG. 1, compute instance 190A may execute agent software 191A, compute instance 190B may execute agent software 191B, and compute instance 190N may execute agent software 191N. The various copies of the agent software 191A-191N may differ in their underlying program instructions if the compute instances 190A-190N have different platforms (e.g., different operating systems and/or computing hardware), but the agent software may generally provide the same functionality across the various instances. Although instances 190A-190N (and their corresponding components) are shown for purposes of illustration and example, it is contemplated that any suitable number and configuration of instances may be used with the service 100. The task execution documents 112B-112N may be sent by the service 100 to the instances 190A-190N through any appropriate instance interface 120, e.g., an application programming interface (API) or other programmatic interface and/or protocol(s) suitable for transmitting requests and data over a network. On the respective instances, the agents may initiate and oversee task execution based (at least in part) on task execution documents provided by the service 100. For example, instance 190A may include task execution 192A as managed by agent 191A, instance 190B may include task execution 192B as managed by agent 191B, and instance 190N may include task execution 192N as managed by agent 191N. In one embodiment, the agent software may be installed on a compute instance when the instance is provisioned from the provider network 190, e.g., from a machine image that also includes operating system software. In one embodiment, the agent software may be installed with approval from the client that controls the instance, e.g., if the client seeks to use the task execution service. The instance interface 130 may be part of a proprietary messaging infrastructure.

Task execution documents may also be referred to as task definitions or task data structures. Task execution documents may use any suitable format(s) and/or data structure(s) to reference, describe, or otherwise indicate one or more tasks to be performed by computing resources in the provider network 190. The tasks within a task execution document may include entirely different tasks (e.g., tasks having different program code) and/or tasks that run the same program code for different input data. For a particular task, a task execution document may include or reference program instructions to be executed in processing the task; the program instructions may also be referred to as a plug-in. A task execution document may include or reference a set of input data and/or arguments to be processed using the program instructions, potentially using multiple copies of an application or set of program code to process different elements of the input data sequentially or concurrently. For example, a particular task execution document may represent a software installation task, and the document may reference a named plug-in suitable for software installation (potentially a globally available plug-in for multiple clients of the provider network), user-specified parameters (e.g., specifying the location of the installer), arguments for the installer, and so on. In one embodiment, a task execution document may also include or be provided with other suitable metadata, including timing information (e.g., a time to begin processing the workload, an anticipated time to run the workload, and/or a deadline), budgetary information, anticipated resource usage, and so on. For example, the anticipated resource usage associated with a task execution document may indicate one or more values (including a range of values) for anticipated processor usage (e.g., a number of virtual CPUs), memory usage, storage usage, network usage, and/or other hardware resource characteristics.

The agent software 191A-191N may comprise program instructions that are executable to interact with the task execution service 100 to implement execution of tasks on the instance. For example, the agent software may be executable to receive, from the task execution service 100 over a network connection, a task execution document that references or describes one or more tasks to be executed on the instance. The agent software may be further executable to initiate and oversee the execution of the one or more tasks specified in the document. In doing so, the agent software may retrieve any program code (also referred to herein as a plug-in) referenced or specified in the document, initiate the execution of that program code with any input data or arguments referenced or specified in the document, and report any results and/or status updates (e.g., success or failure of the task execution) to an appropriate recipient, such as the task execution service 100. The program code associated with the task execution document may be resident on the instance from startup, may be cached on the instance temporarily (e.g., based on a prior execution), or may be retrieved from an external source over a network. In some embodiments, different compute instances configured with the agent software may be used in parallel by the same client, potentially to execute the same type of task (often with different input) simultaneously. In one embodiment, the agent software 191A-191N may be configured to ask for task execution documents from the task execution service 100, e.g., on a periodic basis. For example, the task execution service 100 may place task execution documents in one or more queues (e.g., with one queue per instance), and one or more documents in the queue may be provided to the corresponding agent upon the service receiving a request from that agent.

In one embodiment, one or more of the clients may be configured with a task execution interface 111 that permits the client to bypass the task execution service 100 in order to initiate task execution on the instances 190A-190N. The task execution interface 111 may be installed on any suitable client device and may be termed a decentralized interface in comparison to the centralized task execution service 100. Using the interface 111, a user of the client computing device 110A may select one of the compute instances accessible to that client and establish a direct connection between the client device and that compute instance. In one embodiment, the connection may be established in the task execution interface 111 by specifying an identifier (e.g., an instance name) or address (e.g., an IP address) of the compute instance 190A. If the identifier is specified, it may be automatically mapped to a suitable address using a lookup table within the interface 111 or using a lookup service external to the computing device 110A that runs the interface. The connection may be established using any suitable protocols implemented on the computing device 110A, the compute instance 190A, and any networking infrastructure or other intermediary components.

In one embodiment, a user may specify suitable access credentials in the task execution interface 111 in order to establish the connection with the compute instance 190A. In one embodiment, the connection may be established between the task execution interface 111 and a compute instance over one or more communication channels. If the interface 111 is external to the compute instance, then suitable communication channels may include one or more network connections. If the interface 111 is instead implemented within the compute instance, then suitable communication channels may include one or more communication channels internal to the instance, e.g., such as a programmatic interface or message passing infrastructure.

As shown in FIG. 1, one or more task execution documents 112A may be sent from the task execution interface 111 to the selected compute instance 190A in a manner that bypasses the task execution service 100. In one embodiment, bypassing the service 100 may include sending the task execution document(s) 112A from the computing device 110A with the interface 111 to the compute instance 190A without invoking the functionality of the service or without sending any data to the service. In one embodiment, the connection between the interface 111 on the computing device 110A and the agent software 191A on the compute instance 190A may be termed a direct connection, even though the connection may be facilitated using various components of a networking infrastructure. In bypassing the task execution service 100, the task execution interface and the compute instance may be used independently of the service. The task execution document(s) 112A submitted using the task execution interface 111 may share the same document format and may be executed in substantially the same manner as task execution documents 112B that could be submitted to the same instance 190A using the task execution service 100. The task execution document(s) 112A may be built, loaded, or otherwise specified using any suitable components, e.g., by being loaded from local storage or network-accessible storage using the task execution interface 111. In one embodiment, the agent software 191A-191N may be configured to ask for task execution documents from the task execution interface 111, e.g., on a periodic basis once the connection with the interface has been established. For example, the task execution interface 111 may place task execution documents in one or more queues (e.g., with one queue per instance), and one or more documents in the queue may be provided to the corresponding agent upon the interface receiving a request from that agent.

Upon receiving the task execution document(s) 112A from the interface 111, the agent software 191A on the compute instance 190A may initiate task execution 192A based (at least in part) on the one or more tasks in the task execution document(s). As discussed above, the agent software 191A may be executable to initiate and oversee the execution of the one or more tasks specified or referenced in the document(s) 112A. In doing so, the agent software 191A may retrieve any program code (also referred to herein as a plug-in) referenced or specified in the document(s) 112A and then initiate the execution of that program code with any input data or arguments referenced or specified in the document(s). The program code associated with the task execution document(s) 112A may be resident on the instance 190A from startup, may be cached on the instance temporarily (e.g., based on a prior execution), or may be retrieved from an external source over a network. In one embodiment, the agent software 191A may include the ability to resume the task execution 192A after failure, reboot, or other interruption, e.g., by continuing with a sequence of tasks specified in the task execution document(s) 112A.

One or more task execution responses 113A, such as results and/or status updates of the task execution 192A, may optionally be sent from the compute instance 190A to the task execution interface 111 in a manner that bypasses the task execution service 100. In one embodiment, bypassing the service 100 may include sending the task results and/or updates 113A from the compute instance 190A (e.g., from the agent 191A) to the client device 110A without invoking the functionality of the service or without sending any data to the service. In bypassing the task execution service 100, the task execution interface 111 and compute instance 190A may be used independently of the service. The results (if any) may include output of the task execution 192A, such as data transformed by the one or more tasks. The status updates (if any) may include notifications of success or failure of the task execution 192A as a whole or of its constituent tasks. In one embodiment, status updates may be returned to the task execution interface 111, while task results may be sent to a different recipient (e.g., a storage location or storage service in the provider network 190).

In one embodiment, the direct connection may be established by the task execution interface 111 accessing the local filesystem of the compute instance 190A. The local filesystem may organize data in storage that is locally accessible to the compute instance 190A. In order to access the filesystem, the task execution interface 111 may first connect to the compute instance 190A by using client software that implements a secure protocol such as secure shell (SSH) (e.g., on Linux operating systems) or remote desktop protocol (RDP) (e.g., on Windows operating systems). The task execution interface 111 and compute instance 190A may both implement the protocol that is used for the direct connection. After making a direct connection to the compute instance 190A using an appropriate protocol, the task execution interface 111 may load, build, or otherwise determine one or more task execution documents 112A for submission to the instance. Over the direct connection, the interface 111 may place the task execution document(s) 112A in a predetermined location in the filesystem of the compute instance 190A, e.g., a location where the agent software 191A expects to find task documents to execute. In order to write to the predetermined location, the user of the interface 111 may be authenticated by the local operating system on the compute instance 190A, e.g., using a username and password or other credentials supplied by the user. The agent software 191A may rely on access control lists (ACLs) enforced by the filesystem to ensure that transferred documents are validly submitted. The agent software 191A may automatically detect the presence of the document(s) 112A and initiate local execution of the one or more tasks described in the document(s). The agent software 191A may store any response(s) 113A in a predetermined location in the local filesystem, and the task execution interface 111 may, over the direct connection with the secure protocol, detect the presence of the response(s) in that location. Upon detecting the response(s) 113A in the filesystem of the compute instance 190A, the task execution interface 111 may transfer the responses over the direct connection and present the response(s) to the user. Using the local filesystem to transfer data in this manner, the transferred data may not be encrypted (though the direct connection may be established using a secure protocol).

Any other suitable protocol or technology may be used to establish a direct connection and transfer data between the task execution interface 111 and the compute instance 190A. In one embodiment, after establishing a direct connection using a protocol such as SSH or RDP, the interface 111 may use an inter-process communication (IPC) mechanism, such as named pipes or Unix sockets, to transfer the task execution document(s) 112A to the compute instance 190A. In one embodiment, the interface 111 may transfer the document(s) 112A to the instance 190A using a remote procedure call (RPC) mechanism that does not necessarily require a preexisting connection using SSH or RDP. Suitable RPC mechanisms may include the component object model (COM) on Windows or an authenticated RESTful service endpoint on Linux. Using a RESTful service, data may be transferred and using encryption (e.g., using a key exchange) and session startup/teardown mechanisms associated with transmission control protocol (TCP), transport layer security (TLS), and/or hypertext transport protocol (HTTP). In one embodiment, a network filesystem may be used to transfer the document(s) 112A and response(s) 113A. For example, the interface 111 may place the document(s) 112A in a central location where a group of agents are configured to look for new tasks or may instead place the document(s) directly onto the filesystem of the compute instance 190A. User authorization mechanisms may differ based on the underlying channel. For example, named pipes may rely on ACLs and the user identity provided by the operating system. Other forms of communication, such as transfer over a network filesystem, may rely on a trusted authentication mechanism like Active Directory or Identity and Access Management (IAM) associated with Amazon Web Services (AWS). Yet other forms of communication may rely on certificate-based authentication.

In one embodiment, the compute instances 190A-190N may be provisioned from one or more resource pools of a provider network 190. The provider network 190 may offer different resource pools. In one embodiment, the different pools may vary in the hardware characteristics of their constituent resources, such as a processor capability or configuration, a memory capability or configuration, a storage capability or configuration, a networking capability or configuration, and so on. In one embodiment, the different pools may vary in geographical location, potentially including different availability zones as configured by the operator of the provider network 190. The availability zones may represent locations or areas within regions, and the regions may be defined by appropriate boundaries (e.g., geographic, business-based, political, and/or arbitrary). In one embodiment, the different pools may represent different purchasing modes offered by the provider network 190. For example, one or more of the computing resources 190A-190N may be offered in a spot market in which an instance reservation is not be guaranteed to be maintained if a higher bid is received. As another example, one or more of the computing resources 190A-190N may be offered in an on-demand market in which an instance reservation may be guaranteed for an agreed-upon duration (e.g., one hour). As yet another example, one or more of the computing resources 190A-190N may be offered in a long-term market in which an instance reservation may be guaranteed for a longer duration (e.g., one year). The different purchasing modes may be associated with different costs to clients, e.g., such that spot instances are typically less expensive per unit of time than on-demand instances.

In one embodiment, clients may use the task execution service 100 and/or task execution interface 111 to manage instances that they have reserved from the provider network 190. An instance may be said to be owned by or associated with a respective client at a given time. The client devices 110A-110N may represent or correspond to various clients, users, or customers of the compute environment management system 100 and of the provider network 190. The clients, users, or customers may represent individual persons, businesses, other organizations, and/or other entities. The client devices 110A-110N may be distributed over any suitable locations or regions. A user of a client device may access the task execution service 100 and/or instances 190A-190N with a user account that is associated with an account name or other user identifier. The user may belong to an organization (e.g., a business entity) that is a client or customer of the task execution service 100 and the provider network 190, e.g., with an arrangement in place to pay fees for use of the provider network 190. The user account may be controlled by an individual user or by multiple users within an organization. Each of the client devices 110A-110N may be implemented using one or more computing devices, any of which may be implemented by the example computing device 3000 illustrated in FIG. 8. The clients 110A-110N may be coupled to the task execution service 100 and instances 190A-190N via one or more networks, potentially including a public network such as the Internet.

The client devices 110A-110N may encompass any type of client configurable to submit information to the task execution service 100 and/or instances 190A-190N. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 110A-110N may be configured to generate network-based service requests according to a Representational State Transfer (REST)-style network-based services architecture, a document- or message-based network-based services architecture, or another suitable network-based services architecture. In some embodiments, one of the client devices 110A-110N may be configured with access to a virtual compute instance in the provider network 190 in a manner that is transparent to applications implemented on the client device to utilize computational resources provided by the virtual compute instance. In at least some embodiments, client devices 110A-110N may provision, mount, and configure storage volumes implemented at storage services within the provider network 190 for file systems implemented at the client devices.

Client devices 110A-110N may convey task execution documents and network-based service requests to the task execution service 100 via one or more networks. Similarly, client device 110A may convey task execution documents and other requests to the agent 191A on the instance 190A via one or more networks. The task execution service 100 may convey task execution documents and other information to the instances 190A-190N via one or more networks. In various embodiments, the network(s) may encompass any suitable combination of networking hardware and protocols necessary to establish network-based communications between various components. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the task execution service 100 may be respectively provisioned within enterprises having their own internal networks. As another example, one or more of the compute instances 190A-190N may be provisioned within a private network and without access to the Internet. The network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the task execution service 100. In some embodiments, client devices 110A-110N may communicate with the task execution service 100 or instances 190A-190N using a private network rather than the public Internet.

When not in use by clients, the compute instances 190A-190N may belong to various pools of available computing resources in the provider network 190. A resource manager associated with the provider network 190 may reserve and provision individual ones of the resources for individual clients. The resource manager may also deprovision individual ones of the resources and return them to the pool of available resources of the provider network 190. The provider network 190 may include additional components not shown, fewer components than shown, or different combinations, configurations, or quantities of the components shown.

The provider network 190 may include a network set up by an entity such as a company or a public sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multitenancy and may be termed a multi-tenant provider network. For example, different virtual compute instances in a multi-tenant provider network 190 may be concurrently used for the processing of jobs by client 110A as well as by client 110N.

In some embodiments, an operator of the provider network 190 may implement a flexible set of resource reservation, control, and access interfaces for their clients. For example, the resource manager may implement a programmatic resource reservation interface (e.g., via a web site or a set of web pages) that allows clients and/or other components to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation. In one embodiment, the provider network 190 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores, including virtual CPUs), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager and may be allocated to some other client that is willing to pay a higher price. Other purchasing modes or combinations of modes may be implemented by the resource manager in some embodiments.

Figure 8:
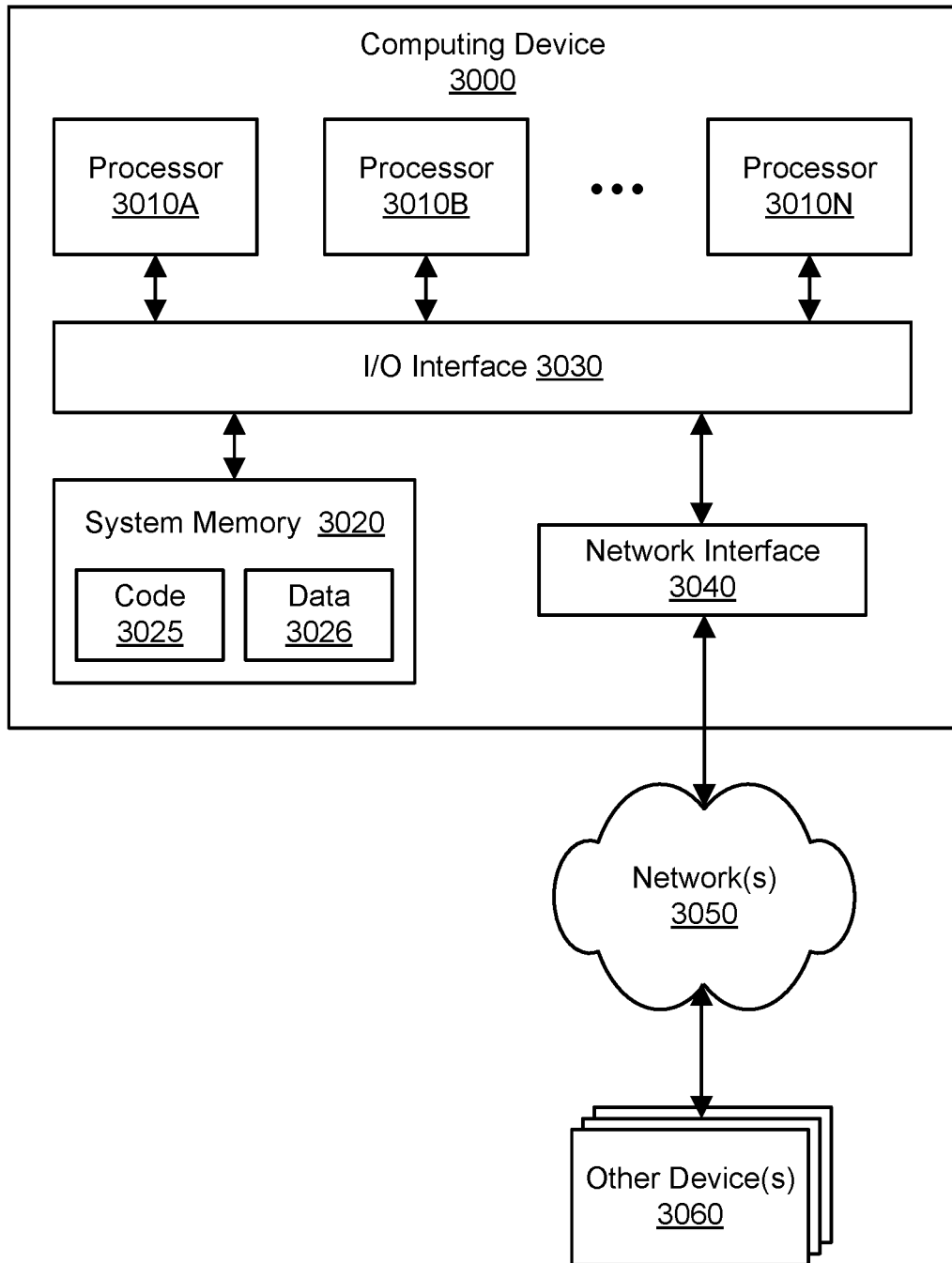
FIG. 8 illustrates an example computing device that may be used in some embodiments.

The task execution service 100 may include a plurality of computing devices, any of which may be implemented by the example computing device 3000 illustrated in FIG. 8. In various embodiments, portions of the described functionality of the task execution service 100 may be provided by the same computing device or by any suitable number of different computing devices. If any of the components of the task execution service 100 are implemented using different computing devices, then the components and their respective computing devices may be communicatively coupled, e.g., via a network. Each of the illustrated components may represent any combination of software and hardware usable to perform their respective functions. It is contemplated that the task execution service 100 may include additional components not shown, fewer components than shown, or different combinations, configurations, or quantities of the components shown.

Figure 2:
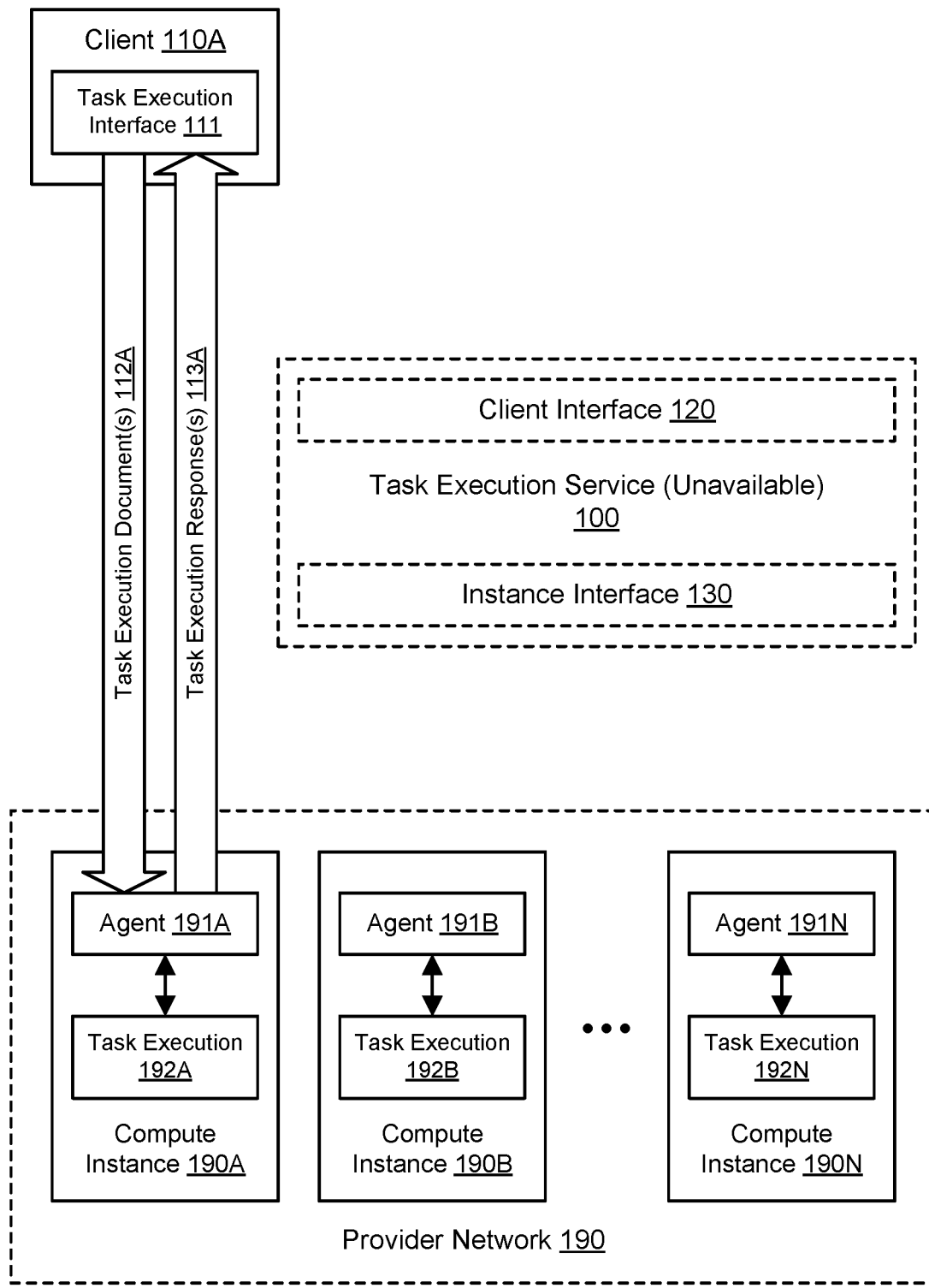
FIG. 2 illustrates further aspects of the example system environment for decentralized task execution that bypasses a task execution service, including bypassing the task execution service while it is unavailable, according to one embodiment.

FIG. 2 illustrates further aspects of the example system environment for decentralized task execution that bypasses a task execution service, including bypassing the task execution service while it is unavailable, according to one embodiment. In one embodiment, the task execution interface 111 may allow users to continue executing tasks on their instances even when problems arise with the task execution service 100. For example, as shown in FIG. 2, the task execution service 100 may be temporarily offline or unavailable, e.g., due to failure or overloading of the service or a network outage. When the service 100 is unavailable to the client 110A, the task execution interface 111 on the client device may contact one or more compute instances directly and without using the service as an intermediary.

In various embodiments, the availability or unavailability of the service 100 may be determined manually (e.g., by specific action taken by a user) or automatically (e.g., without necessarily requiring user input) and programmatically (e.g., by execution of program instructions). The service 100 may be unavailable for any suitable reason, such as hardware failure, software failure, network failure, and so on. In one embodiment, the service 100 may be deemed unavailable if the service is unable to respond to requests within a threshold period of time. In one embodiment, the service 100 may be deemed unavailable due to being overloaded by a large-scale event (LSE) in the provider network 190, e.g., an event resulting in heavy usage of the service, of the networking infrastructure associated with the service, or of related resources. An unavailable service 100 may also be termed unreachable. By using a direct connection afforded by the task execution interface 111 in this manner, initiation of task execution may be decentralized and made more robust.

Figure 3:
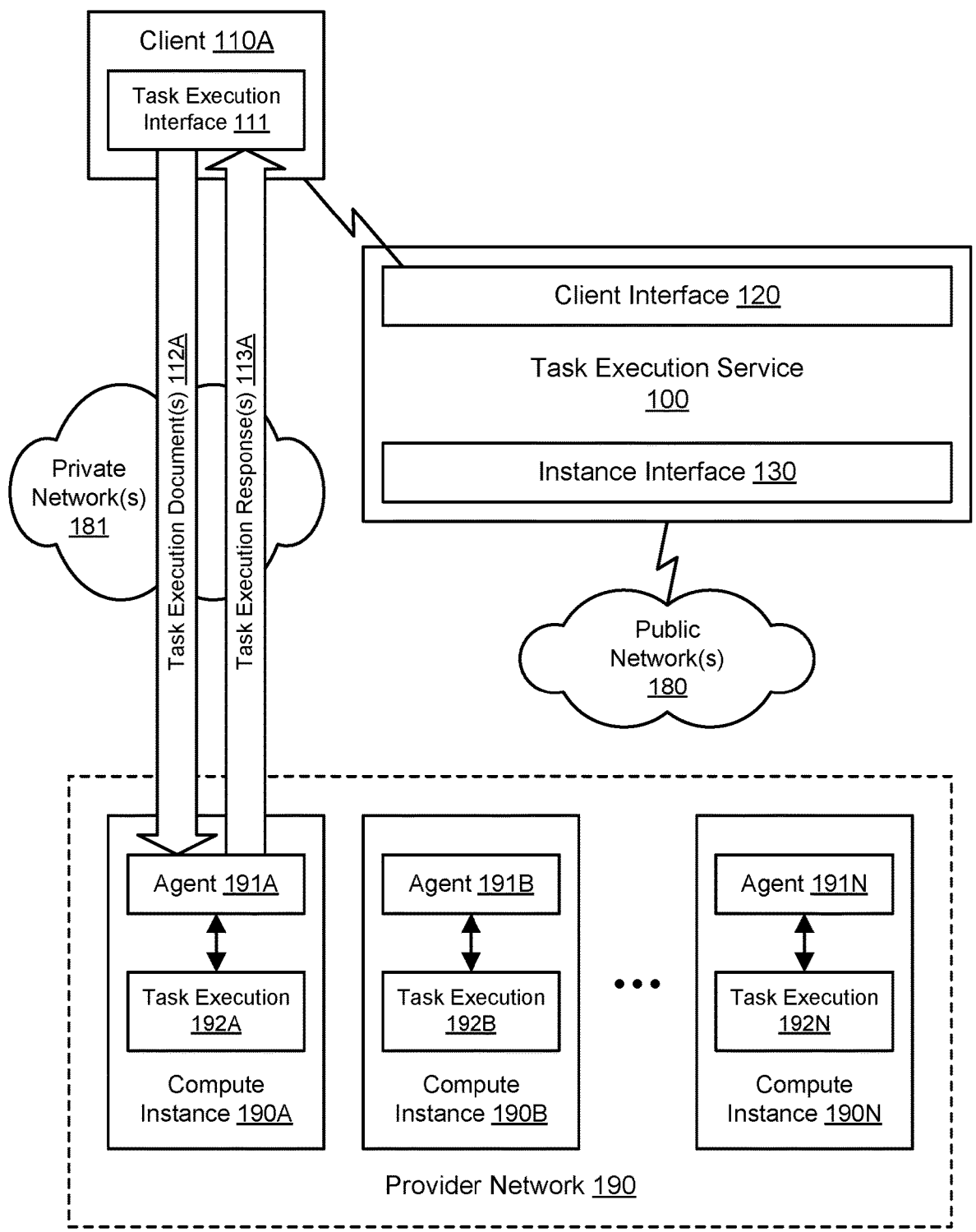
FIG. 3 illustrates further aspects of the example system environment for decentralized task execution that bypasses a task execution service, including bypassing the task execution service while it cannot reach compute instances used for the task execution, according to one embodiment.

FIG. 3 illustrates further aspects of the example system environment for decentralized task execution that bypasses a task execution service, including bypassing the task execution service while it cannot reach compute instances used for the task execution, according to one embodiment. In one embodiment, the task execution interface 111 may allow users to continue executing tasks on their instances even when problems arise with the task execution service 100. For example, as shown in FIG. 3, one or more compute instances 190A-190N may be unreachable by the service 110 while being reachable by the client device 110A that includes the task execution interface 111. In one embodiment, the instances 190A-190N may be reachable only via one or more private (privately accessible) networks 181, and the client device 110A may be able to access such network(s). For example, the instances 190A-190N may be implemented on client premises and not connected to any public network(s) 180 such as the Internet. When the service 100 cannot reach a compute instance such as instance 190A, the task execution interface 111 on the client device 110A may contact the compute instance 190A directly and without using the service as an intermediary. In various embodiments, the possibility of making a connection between the service 100 and a compute instance 190A may be determined manually (e.g., by specific action taken by a user) or automatically (e.g., without necessarily requiring user input) and programmatically (e.g., by execution of program instructions). By using a direct connection afforded by the task execution interface 111 in this manner, initiation of task execution may be decentralized and made more robust.

The interface 111 may also be used to provide task execution documents directly to instances for testing and debugging purposes. For example, the client 110A may deploy a new (or newly modified) and untested task execution document 112A to a particular compute instance 190A while bypassing the task execution service 100. Using the direct connection afforded by the interface 111, the execution of the corresponding task(s) may take place in a smaller-scale and/or testing environment before deployment to a larger-scale and/or production environment. The client 110A may receive task execution response(s) 113A, and the responses may be used to modify the document further or to verify that the task execution was performed as intended. The task execution document 112A may then be deployed to the task execution service 100 for execution with one or more of the compute instances 190A-190N. In one embodiment, the task execution service may be focused primarily on remote administration, and the task execution interface 111 may be used to initiate execution of additional types of tasks that are not necessarily supported by the task execution service 100.

Figure 4A:
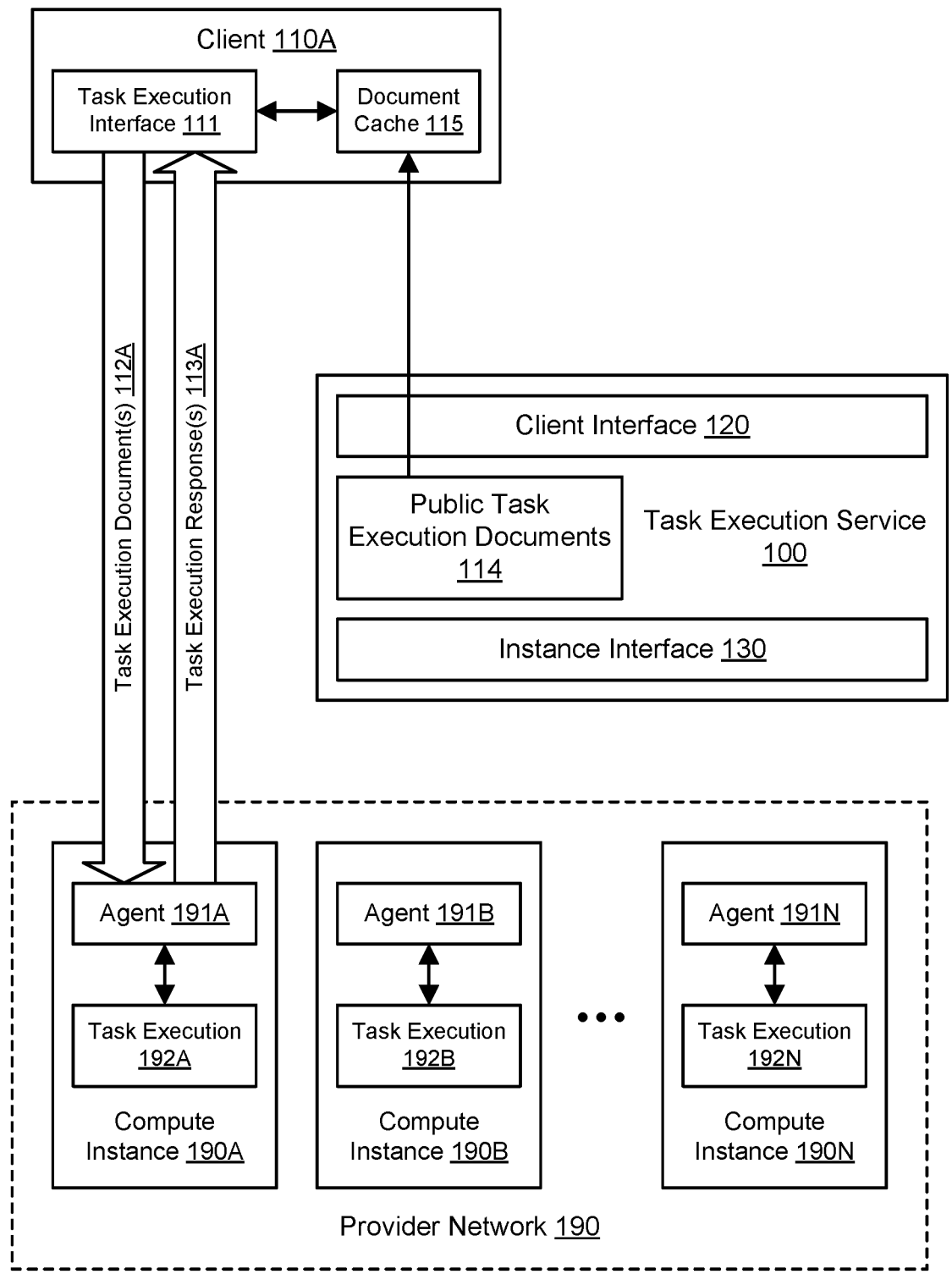
FIG. 4A through FIG. 4C illustrate further aspects of the example system environment for decentralized task execution that bypasses a task execution service, including caching task execution documents for use when the task execution service is unavailable, according to one embodiment.
Figure 4B:
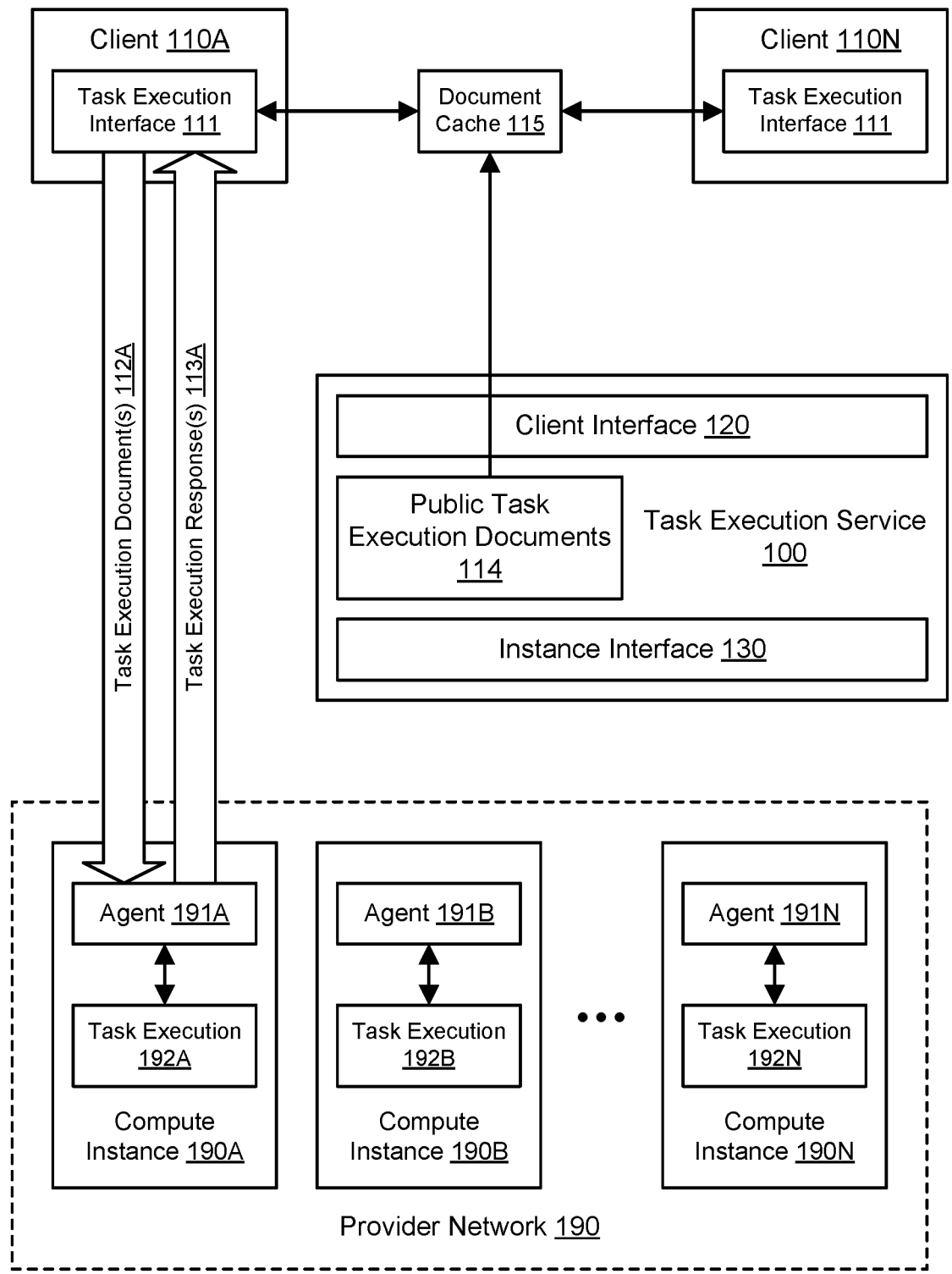
Figure 4C:
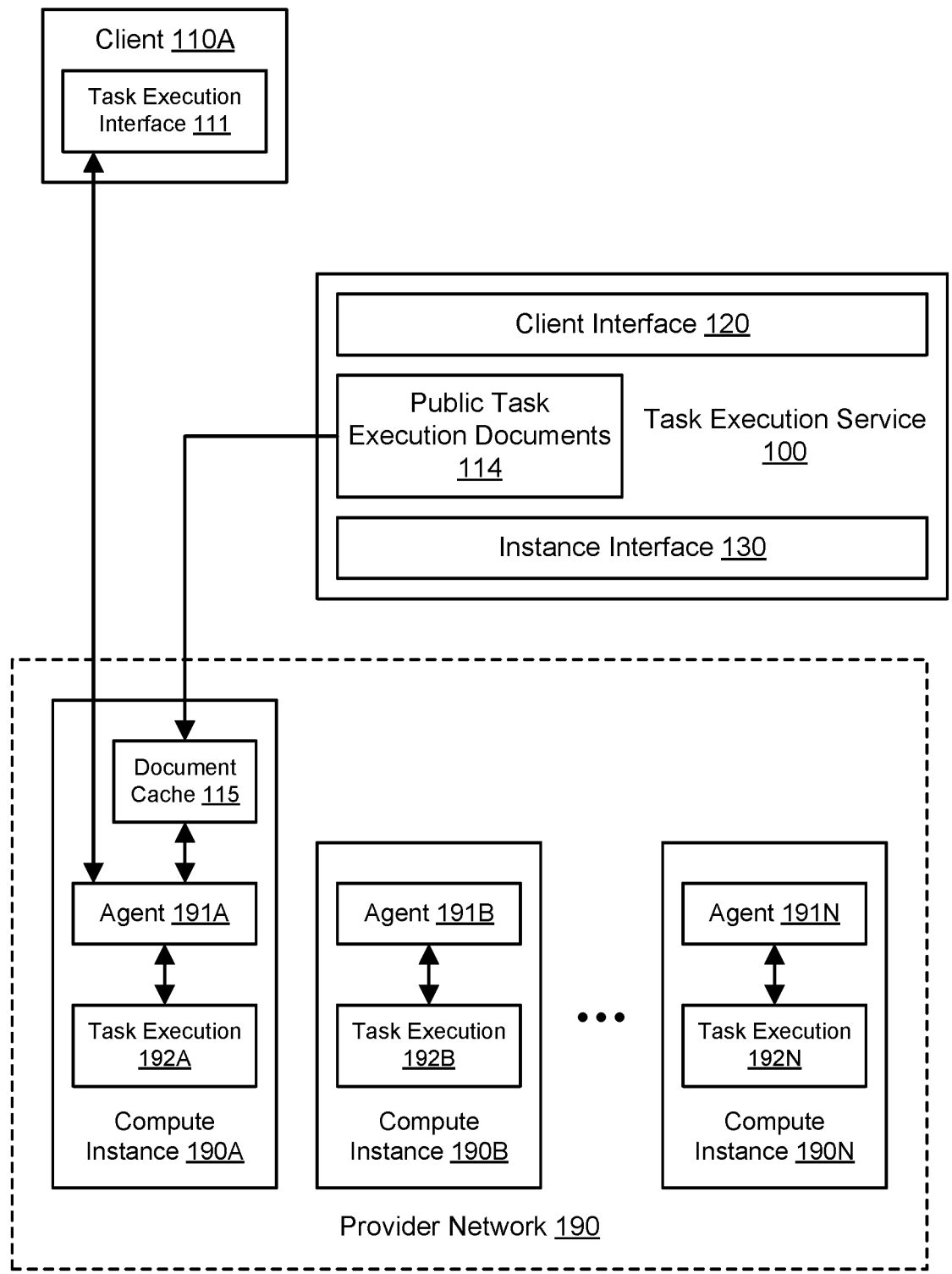

FIG. 4A through FIG. 4C illustrate further aspects of the example system environment for decentralized task execution that bypasses a task execution service, including caching task execution documents for use when the task execution service is unavailable, according to one embodiment. As discussed above, the task execution document(s) 112A submitted using the task execution interface 111 may share the same document format and may be executed in substantially the same manner as task execution documents 112B that could be submitted to the same instance 190A using the task execution service 100. The task execution document(s) 112A may be built, loaded, or otherwise specified using any suitable components, e.g., by being loaded from local storage or network-accessible storage using the task execution interface 111. In one embodiment, as shown in FIG. 4A, the client device 110A may also include a cache 115 of task execution documents. The cache 115 of documents may be periodically synchronized or updated from a set of public task execution documents 114 maintained by the task execution service 100. The public documents 114 may be available globally or to multiple clients and may represent templates for building or otherwise deriving custom task execution documents for particular clients. In one embodiment, as shown in FIG. 4B, the document cache 115 may be stored in an external component such as a service or data store and accessed by various client devices 110A and 110N even if the service 100 is unavailable. In one embodiment, as shown in FIG. 4C, the document cache 115 may be stored in one of the instances (such as instance 190A), e.g., in internal storage or in storage locally accessible to the instance even if the service 100 is unavailable. In such circumstances, a task execution document may be loaded by the agent 191A from the local document cache 115, e.g., upon receiving suitable instructions from a user via the task execution interface 111. By caching task execution documents outside of a task execution service 100, a user may be able to retrieve a stored document and potentially customize it, even if the service is temporarily unavailable.

Figure 5A:
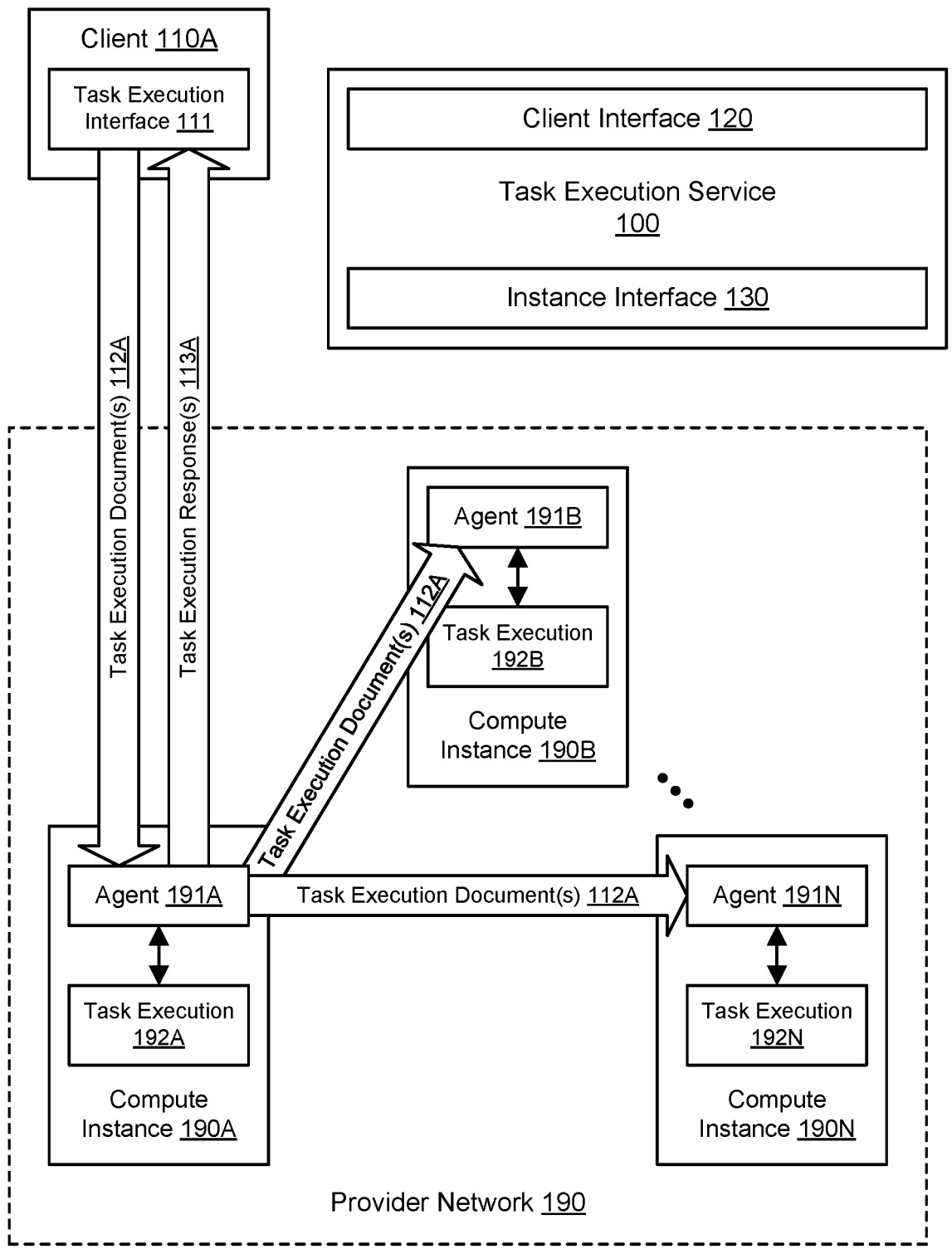
FIG. 5A illustrates further aspects of the example system environment for decentralized task execution that bypasses a task execution service, including the use of one compute instance as a coordinator of other compute instances, according to one embodiment.

FIG. 5A illustrates further aspects of the example system environment for decentralized task execution that bypasses a task execution service, including the use of one compute instance as a coordinator of other compute instances, according to one embodiment. In one embodiment, a compute instance such as instance 190A may be used as a coordinator or manager of task execution for other instances such as instances 190B-190N. The agent 191A on the instance 190A may receive task execution document(s) 112A as discussed above. In various embodiments, the agent 191A may or may not initiate local task execution 192A based (at least in part) on the document(s) 112A. The agent 191A (or a related component) may send at least a portion of the document(s) 112A to the instances 190B-190N, e.g., using direct connections between the two endpoints. For example, the user of the client device 110A may submit, to the agent 191A, a list of the instances that are intended to be used for the execution of the document(s) 112A. In one embodiment, the agent 191A may also marshal task execution results and/or status updates from the other instances 190B-190N before returning the results and/or updates to the client 110A. By using peer-to-peer connections among instances 190A-190N with coordination by a single instance, the deployment of task execution documents may be simplified for the user of the task execution interface 111.

Figure 5B:
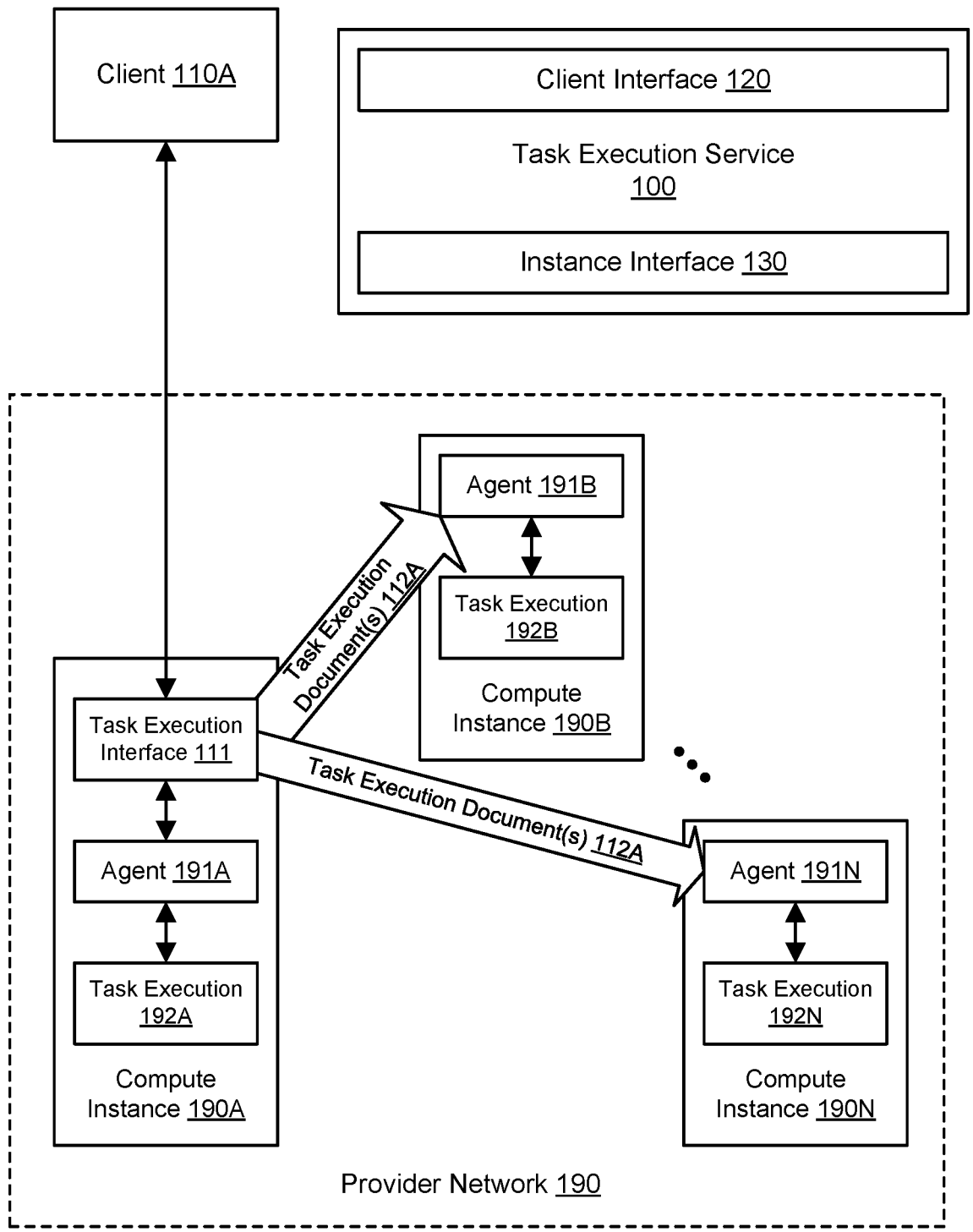
FIG. 5B illustrates further aspects of the example system environment for decentralized task execution that bypasses a task execution service, including the implementation of the task execution interface in a compute instance, according to one embodiment.

FIG. 5B illustrates further aspects of the example system environment for decentralized task execution that bypasses a task execution service, including the implementation of the task execution interface in a compute instance, according to one embodiment. As discussed above with respect to FIG. 5A, a compute instance such as instance 190A may be used as a coordinator or manager of task execution for other instances such as instances 190B-190N. As shown in FIG. 5B, the compute instance 190A may include at least a portion of the task execution interface 111. A user of a client device 110A may use any suitable communication channel to access or log in to the interface 111 on the instance 190A in order to provide user input, e.g., to specify and load task execution document(s) 112A using the interface. In various embodiments, the agent 191A may or may not initiate local task execution 192A based (at least in part) on the document(s) 112A. The task execution interface 111 (or a related component) may send at least a portion of the document(s) 112A to the instances 190B-190N, e.g., using direct connections between the two endpoints. For example, the user of the client device 110A may submit, to the agent 191A using the interface 111, a list of the instances that are intended to be used for the execution of the document(s) 112A. In one embodiment, the task execution interface 111 may also marshal task execution results and/or status updates from the other instances 190B-190N. By using peer-to-peer connections among instances 190A-190N with coordination by a single instance that runs the task execution interface 111, the deployment of task execution documents may be simplified for the user of the task execution interface.

Figure 5C:
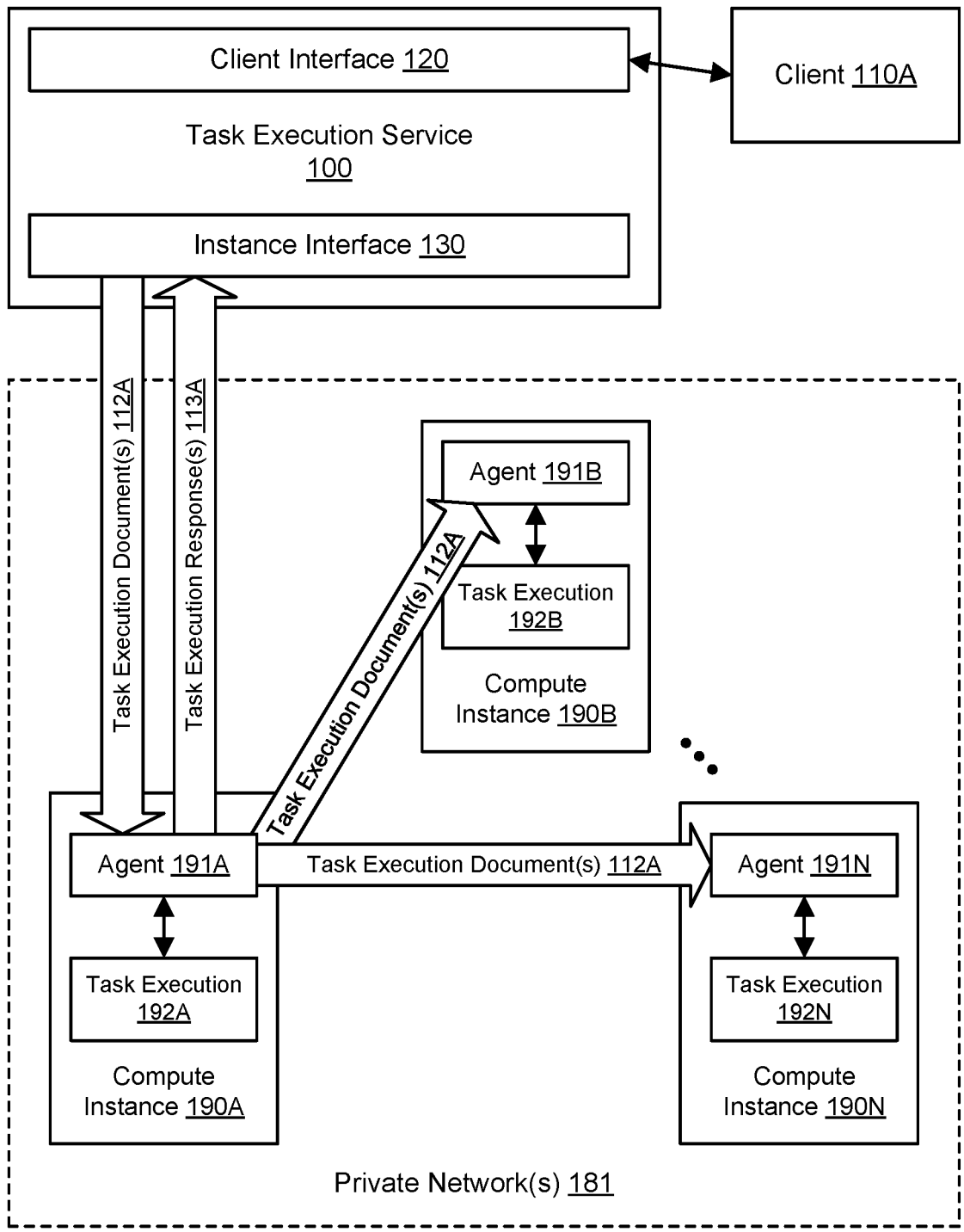
FIG. 5C illustrates further aspects of the example system environment for decentralized task execution that bypasses a task execution service, including the use of one compute instance as a coordinator of other compute instances that the task execution service cannot reach, according to one embodiment.

FIG. 5C illustrates further aspects of the example system environment for decentralized task execution that bypasses a task execution service, including the use of one compute instance as a coordinator of other compute instances that the task execution service cannot reach, according to one embodiment. As discussed above with respect to FIG. 5A and FIG. 5B, a compute instance such as instance 190A may be used as a coordinator or manager of task execution for other instances such as instances 190B-190N. As shown in FIG. 5C, the compute instance 190A may be directly reachable by the task execution service 100 at some point in time, but other instances such as instances 190B-190N may not be directly reachable by the service at that point in time. For example, the instance 190A and the service 100 may communicate over a publicly accessible network such as the Internet, while the instances 190B-190N may be accessible only via one or more privately accessible networks 181 (to which the task execution service 100 does not have access). A user of a client device 110A may use any suitable communication channel to access the task execution service 100 in order to provide user input, e.g., to specify and load task execution document(s) 112A using the client interface 120. The service 100 may then provide the task execution document(s) 112A to the agent software 191A on the reachable instance 190A. In various embodiments, the agent 191A may or may not initiate local task execution 192A based (at least in part) on the document(s) 112A. The task execution interface 111 (or a related component) may send at least a portion of the document(s) 112A to the instances 190B-190N, e.g., using direct connections between the two endpoints. For example, the user of the client device 110A may submit, to the agent 191A via the task execution service 100, a list of the instances that are intended to be used for the execution of the document(s) 112A. In one embodiment, the agent 191A may also marshal task execution results and/or status updates from the other instances 190B-190N. By using peer-to-peer connections with privately accessible instances 190B-190N with coordination by a more accessible instance 190A, the deployment of task execution documents may be simplified for the user of the task execution interface 111.

Figure 6:
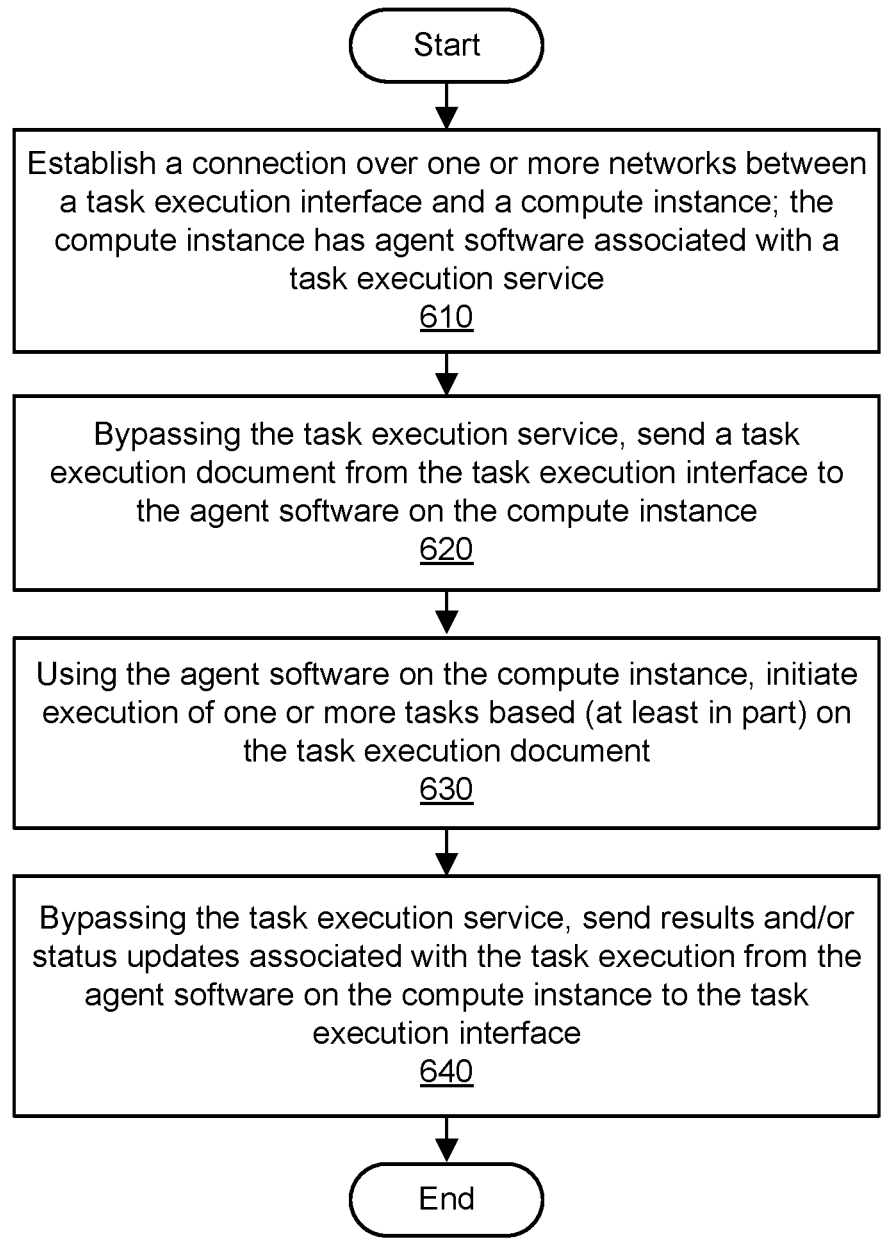
FIG. 6 is a flowchart illustrating a method for decentralized task execution that bypasses a task execution service, according to one embodiment.

FIG. 6 is a flowchart illustrating a method for decentralized task execution that bypasses a task execution service, according to one embodiment. As shown in 610, a connection may be established between a task execution interface and a compute instance. The task execution interface may be implemented using program instructions that are executable on a computing device. In one embodiment, the task execution interface may comprise a command-line interface (CLI). In one embodiment, the task execution interface may comprise a graphical user interface (GUI). In one embodiment, the task execution interface may comprise any other suitable type of user interface, such as a voice-based interface. The connection may be established over one or more networks, including public (publicly accessible) networks such as the Internet and/or private (privately accessible) networks. The connection may be established in the task execution interface by specifying an identifier (e.g., an instance name) or address (e.g., an IP address) of the compute instance. If the identifier is specified, it may be automatically mapped to a suitable address using a lookup table within the interface or using a lookup service external to the computing device that runs the interface. The connection may be established using any suitable protocols implemented on the computing device, the compute instance, and any networking infrastructure or other intermediary components. In one embodiment, a user may specify suitable access credentials in the task execution interface in order to establish the connection with the compute instance.

In one embodiment, the compute instance may be selected from a set of compute instances that are associated with and available to a client of a provider network. The compute instance may be selected by the user of the task execution interface, and the user's access may be dependent upon her or his affiliation with the particular client associated with the instance. In one embodiment, the provider network may comprise a multi-tenant provider network in which computing resources such as compute instances are offered to different clients on a temporary basis, e.g., based on a predetermined fee structure; control of at least some of the resources can be transferred from client to client, e.g., when one client's lease has expired. Such multi-tenant resources may typically be located in one or more data centers and accessed by the client over a public network. In one embodiment, the provider network may comprise a single-tenant provider network in which computing resources such as compute instances are managed by a particular organization and are offered to users within that organization; such compute instances may be deemed "on premises" and/or may be accessible over a private network. The compute instance may comprise a virtual compute instance built on a physical compute instance.

The compute instance may include, in storage associated with the instance, agent software associated with a task execution service. The task execution service may be implemented using one or more computing devices and may be network-accessible to clients and to instances, e.g., over a public network such as the Internet. In one embodiment, the agent software may be installed on a compute instance when the instance is provisioned from the provider network, e.g., from a machine image that also includes operating system software. In one embodiment, the agent software may be installed with approval from the client that controls the instance, e.g., if the client seeks to use the task execution service.

The agent software may comprise program instructions that are executable to interact with the task execution service to implement execution of tasks on the instance. For example, the agent software may be executable to receive, from the task execution service over a network connection, a task execution document that references or describes one or more tasks to be executed on the instance. The agent software may be further executable to initiate and oversee the execution of the one or more tasks specified in the document. In doing so, the agent software may retrieve any program code (also referred to herein as a plug-in) referenced or specified in the document, initiate the execution of that program code with any input data or arguments referenced or specified in the document, and report any results and/or status updates (e.g., success or failure of the task execution) to an appropriate recipient, such as the task execution service. The program code associated with the task execution document may be resident on the instance from startup, may be cached on the instance temporarily (e.g., based on a prior execution), or may be retrieved from an external source over a network. In some embodiments, different compute instances configured with the agent software may be used in parallel by the same client, potentially to execute the same type of task (often with different input) simultaneously.

As shown in 620, a task execution document may be sent from the task execution interface to the selected compute instance in a manner that bypasses the task execution service. In one embodiment, bypassing the service may include sending the task execution document from the computing device with the interface to the compute instance without invoking the functionality of the service or without sending any data to the service. In one embodiment, the connection between the interface on the computing device and the agent software on the compute instance may be termed a direct connection, even though the connection may be facilitated using various components of a networking infrastructure. In bypassing the task execution service, the task execution interface and the compute instance may be used independently of the service. The task execution document submitted using the task execution interface may share the same document format and may be executed in substantially the same manner as task execution documents that could be submitted using the task execution service. The task execution document may be built, loaded, or otherwise specified using any suitable components, e.g., by being loaded from local storage or network-accessible storage using the task execution interface. In one embodiment, the computing device with the interface may also include a cache of task execution documents that may represent templates for building custom documents. The cache of documents may be periodically synchronized or updated from a set of public task execution documents maintained by the task execution service.

As shown in 630, using the agent software on the compute instance, execution of the one or more tasks in the task execution document may be initiated on the instance. As discussed above, the agent software may be executable to initiate and oversee the execution of the one or more tasks specified or referenced in the document. In doing so, the agent software may retrieve any program code (also referred to herein as a plug-in) referenced or specified in the document and then initiate the execution of that program code with any input data or arguments referenced or specified in the document. The program code associated with the task execution document may be resident on the instance from startup, may be cached on the instance temporarily (e.g., based on a prior execution), or may be retrieved from an external source over a network. In some embodiments, different compute instances configured with the agent software may be used in parallel by the same client through the task execution interface, potentially to execute the same type of task (often with different input) simultaneously. In one embodiment, the agent software may include the ability to resume the task execution after failure, reboot, or other interruption, e.g., by continuing with a sequence of tasks specified in the task execution document.

As shown in 640, one or more results and/or status updates of the task execution may optionally be sent from the compute instance to the task execution interface in a manner that bypasses the task execution service. In one embodiment, bypassing the service may include sending the task results and/or updates from the compute instance to the computing device with the interface without invoking the functionality of the service or without sending any data to the service. In bypassing the task execution service, the task execution interface and compute instance may be used independently of the service. The results (if any) may include output of the task execution, such as data transformed by the one or more tasks. The status updates (if any) may include notifications of success or failure of the task execution as a whole or of its constituent tasks. In one embodiment, status updates may be returned to the task execution interface, while task results may be sent to a different recipient (e.g., a storage location or storage service in the provider network).

Figure 7A:
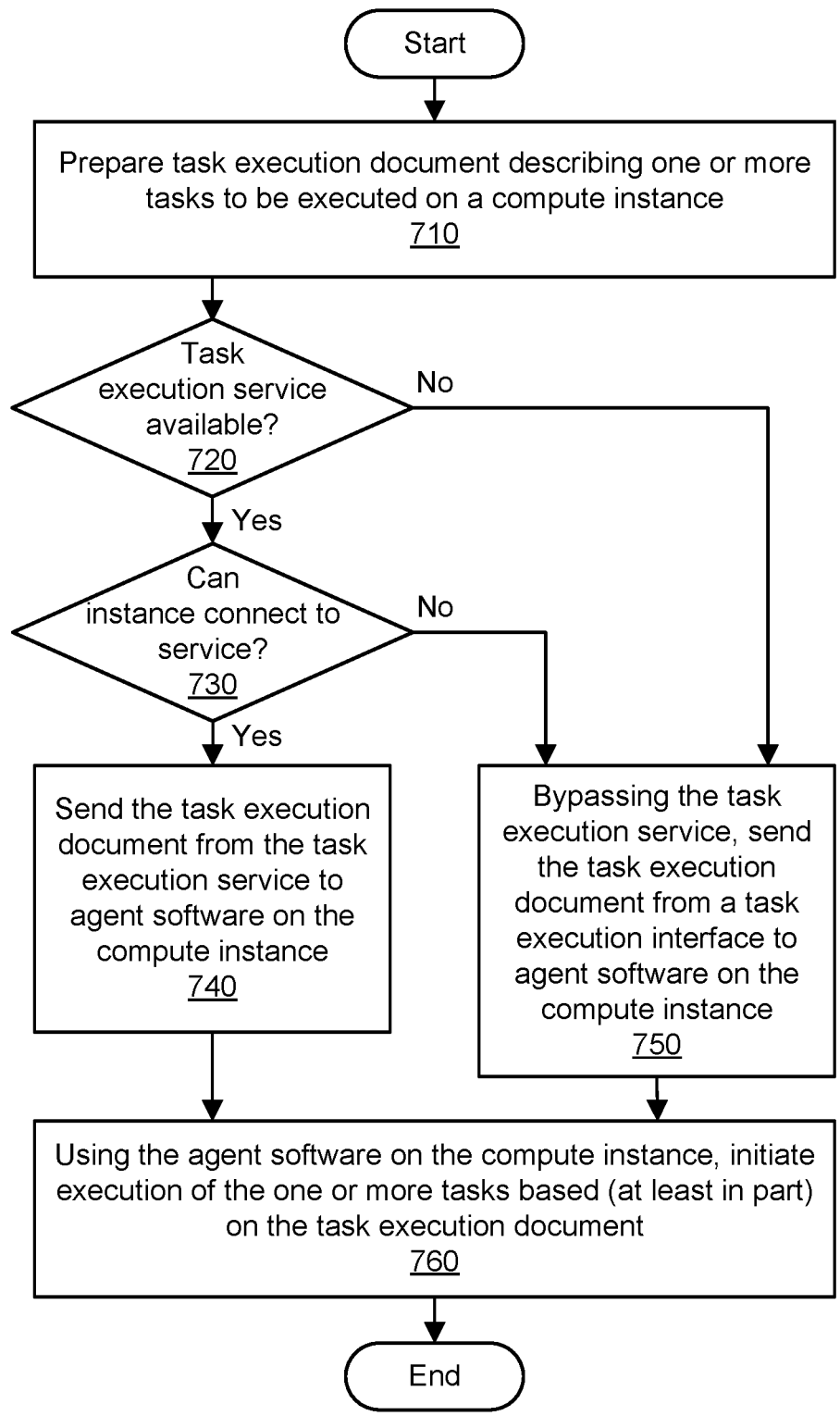
FIG. 7A is a flowchart illustrating a method for decentralized task execution that bypasses a task execution service, including determining whether the task execution service is available and connected to a compute instance, according to one embodiment.

FIG. 7A is a flowchart illustrating a method for decentralized task execution that bypasses a task execution service, including determining whether the task execution service is available and connected to a compute instance, according to one embodiment. As shown in 710, a task execution document may be built, loaded, or otherwise prepared. The task execution document may reference or describe one or more tasks to be executed on an instance, e.g., by referencing or specifying program code (also referred to herein as a plug-in) with any input data or arguments for the task(s). In one embodiment, the task execution document may be loaded into a task execution interface usable for bypassing a task execution service. In one embodiment, the task execution document may be loaded into an interface of the task execution service itself, e.g., from a client computing device using a suitable user interface (e.g., a CLI or GUI) and/or programmatic interface (e.g., an application programming interface). In one embodiment, the task execution interface on the computing device may also serve as a user interface for the task execution service, by invoking the functionality of the service over a network. The task execution document may be built, loaded, or otherwise specified using any suitable components, e.g., by being loaded from local storage or network-accessible storage. In one embodiment, the computing device with the interface may also include a cache of task execution documents that may represent templates for building custom documents. The cache of documents may be periodically synchronized or updated from a set of public task execution documents maintained by the task execution service.

As shown in 720, the method may determine whether the task execution service is available to the client who seeks to initiate task execution. In various embodiments, the availability or unavailability of the service may be determined manually (e.g., by specific action taken by a user) or automatically (e.g., without necessarily requiring user input) and programmatically (e.g., by execution of program instructions). The service may be unavailable for any suitable reason, such as hardware failure, software failure, network failure, and so on. In one embodiment, the service may be deemed unavailable if the service is unable to respond to requests within a threshold period of time. In one embodiment, the service may be deemed unavailable due to being overloaded by a large-scale event (LSE) in the provider network, e.g., an event resulting in heavy usage of the service, of the networking infrastructure associated with the service, or of related resources. An unavailable service may also be termed unreachable.

If the service is available, as shown in 730, the method may determine whether the service is reachable by the compute instance to be used for task execution. In various embodiments, the possibility of making a connection between the service and the compute instance may be determined manually (e.g., by specific action taken by a user) or automatically (e.g., without necessarily requiring user input) and programmatically (e.g., by execution of program instructions). In one embodiment, the instance may not be able to connect to the service (or vice versa), even though the service is otherwise available, if the instance is not accessible on a public network such as the Internet. For example, the compute instance may be accessible only through a private network to which the computing device with the task execution interface also has access, particularly if the interface and the compute instance are implemented on computing devices owned and operated by the same organization.

As shown in 740, if the task execution service is available and also if the service can connect to the compute instance, then the task execution document may be sent from the service to agent software on the compute instance. In one embodiment, the task execution service may send the document in response to a command from a user, e.g., using a suitable user interface or programmatic interface offered by the service. In one embodiment, the document may be sent from a client computing device to the service, or otherwise loaded into the service based (at least in part) on a user command, before being sent to the compute instance. The particular compute instance may be specified (e.g., by a user) using an identifier (e.g., an instance name) or address (e.g., an IP address) of the compute instance. If the identifier is specified, it may be automatically mapped to a suitable address using a lookup table within the service or using a lookup service external to the service. The document may be sent using any suitable protocols implemented on the service, the compute instance, and any networking infrastructure or other intermediary components. In one embodiment, a user may specify suitable access credentials (e.g., using a suitable user interface or programmatic interface offered by the service) in order to send the document to the compute instance.

As shown in 750, if the task execution service is not available or if the service cannot connect to the compute instance, then the task execution document may be sent from the task execution interface (on a computing device independent of the task execution service) to agent software on the compute instance in a manner that bypasses the service. In one embodiment, the task execution interface may send the document in response to a command from a user. The particular compute instance may be specified (e.g., by a user) using an identifier (e.g., an instance name) or address (e.g., an IP address) of the compute instance. If the identifier is specified, it may be automatically mapped to a suitable address using a lookup table within the interface or using a lookup service external to the computing device that runs the interface. The document may be sent using any suitable protocols implemented on the computing device, the compute instance, and any networking infrastructure or other intermediary components. In one embodiment, a user may specify suitable access credentials in the task execution interface in order to send the document to the compute instance.

In one embodiment, bypassing the service may include sending the task execution document from the computing device with the interface to the compute instance without invoking the functionality of the service or without sending any data to the service. In one embodiment, the connection between the interface on the computing device and the agent software on the compute instance may be termed a direct connection, even though the connection may be facilitated using various components of a networking infrastructure. In bypassing the task execution service, the task execution interface and the compute instance may be used independently of the service.

As shown in 760, using the agent software on the compute instance, execution of the one or more tasks in the task execution document may be initiated on the instance. A task execution document submitted using the task execution interface may share the same document format and may be executed in substantially the same manner as a task execution document submitted using the task execution service. As discussed above, the agent software may be executable to initiate and oversee the execution of the one or more tasks specified or referenced in the document. In doing so, the agent software may retrieve any program code (also referred to herein as a plug-in) referenced or specified in the document, initiate the execution of that program code with any input data or arguments referenced or specified in the document, and optionally return task results and/or updates. In some embodiments, different compute instances configured with the agent software may be used in parallel by the same client through both the task execution interface and the task execution service, potentially to execute the same type of task (often with different input) simultaneously. In one embodiment, the agent software may include the ability to resume the task execution after failure, reboot, or other interruption, e.g., by continuing with a sequence of tasks specified in the task execution document.

As shown in FIG. 7A, the task execution interface may allow users to continue executing tasks on their instances even when problems arise with the task execution service. For example, when the task execution service is unavailable (e.g., due to failure or overloading of the service or a network outage), the task execution interface may contact one or more compute instances directly and without using the service as an intermediary. As another example, if one or more compute instances are not reachable by the service but are reachable by the task execution interface (e.g., the instances are on a private network and not connected to the Internet), then the service may similarly be bypassed. The interface may also be used to provide task execution documents directly to instances for testing and debugging purposes. In this manner, initiation of task execution may be decentralized and made more robust, e.g., in a single-tenant or multi-tenant provider network that offers access to compute instances.

Figure 7B:
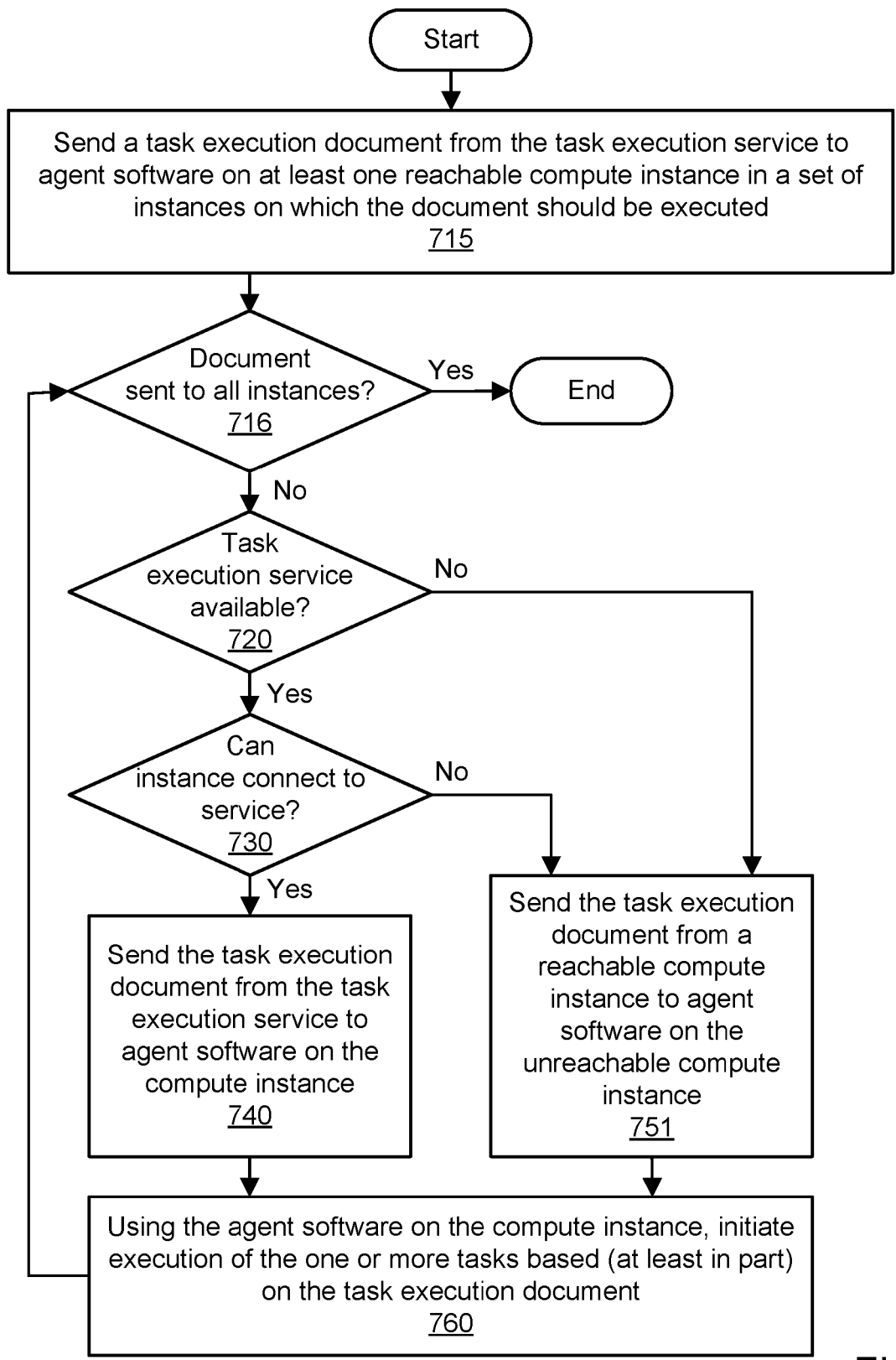
FIG. 7B is a flowchart illustrating a method for decentralized task execution that bypasses a task execution service, including the use of one compute instance as a coordinator of other compute instances that the task execution service cannot reach, according to one embodiment.

FIG. 7B is a flowchart illustrating a method for decentralized task execution that bypasses a task execution service, including the use of one compute instance as a coordinator of other compute instances that the task execution service cannot reach, according to one embodiment. As discussed above with respect to 710, a task execution document may be built, loaded, or otherwise prepared. The task execution document may be associated with a set of compute instances on which the document should be executed, e.g., as specified by user input to the task execution service. As shown in 715, the task execution document may be sent from the service to agent software on at least one compute instance that is currently reachable by the service. As shown in 716, the method may determine whether the document has been sent to all the instances in the set of instances. If so, then the method may end. If any particular instance in the set has not received the task execution document, then the determinations shown in 720 and/or 730 may be performed for that instance, as discussed above with respect to FIG. 7A. As shown in 740, if the task execution service is available and also if the service can connect to the particular compute instance, then the task execution document may be sent from the service to agent software on the compute instance. As shown in 751, if the task execution service is not available or if the service cannot connect to the particular compute instance, then the task execution document may be sent from one of the "reachable" instances to agent software on the compute instance in a manner that bypasses the service. In various embodiments, the operation shown in 751 may be performed autonomously by the reachable instance if the agent on that instance cannot reach the service or otherwise if the service informs that agent that a particular instance is currently unreachable. As shown in 760, using the agent software on the particular compute instance, execution of the one or more tasks in the task execution document may be initiated on the instance.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices that implement a task execution service;
   one or more compute instances, wherein the one or more compute instances comprise agent software, and wherein the agent software is executable to receive task execution documents from the task execution service and initiate local task execution based at least in part on the task execution documents; and
   one or more other computing devices that implement a decentralized task execution interface, wherein the decentralized task execution interface is executable to:
   determine that the task execution service is offline or unreachable by the one or more other computing devices that implement the decentralized task execution interface;
   select, from the one or more compute instances, a set of one or more compute instances;
   establish one or more network connections with the selected set of one or more compute instances without invoking the task execution service;
   send, in response to the determination that the task execution service is offline or unreachable, one or more task execution documents via the one or more network connections to the agent software of the respective compute instances of the selected set of one or more compute instances, wherein the task execution service is bypassed in sending the one or more task execution documents by the decentralized task execution interface to the respective compute instances of the selected set of one or more compute instances, and wherein execution of one or more tasks is initiated on the respective compute instances of the selected set of one or more compute instances by the agent software based at least in part on the one or more task execution documents; and
   receive, from the agent software of the respective compute instances of the selected set of one or more compute instances, one or more responses of the one or more tasks, wherein the task execution service is bypassed by the decentralized task execution interface in receiving the one or more responses from the agent software of the respective compute instances of the selected set of one or more compute instances.

2. The system as recited in claim 1, wherein the selected set of one or more compute instances are disconnected from a publicly accessible network, and wherein the one or more network connections with the selected set of one or more compute instances comprise one or more connections over a private network.

3. The system as recited in claim 1, wherein a modified task execution document is generated based at least in part on the execution of the one or more tasks, and wherein the task execution service is executable to:
   receive the modified task execution document; and
   send the modified task execution document to additional agent software of one or more additional compute instances, wherein execution of one or more additional tasks is initiated on the one or more additional compute instances by the additional agent software based at least in part on the modified task execution document.

4. A computer-implemented method, comprising:
   determining that a task execution service is offline or unreachable by a task execution interface, wherein agent software of a compute instance is executable to receive task execution documents from the task execution service and initiate local task execution based at least in part on the task execution documents;
   establishing a connection between the task execution interface and the agent software of the compute instance over one or more communication channels, wherein the connection between the task execution interface and the agent software of the compute instance is established without invoking the task execution service;
   sending, in response to the determining that the task execution service is offline or unreachable, a task execution document from the task execution interface to the agent software of the compute instance, via the connection over the one or more communication channels, wherein the task execution service is bypassed in sending the task execution document by the task execution interface to the compute instance, and wherein execution of one or more tasks is initiated on the compute instance by the agent software based at least in part on the task execution document; and receiving, at the task execution interface from the agent software of the compute instance, one or more responses of the one or more tasks, wherein the task execution service is bypassed in receiving the one or more responses.

5. The method as recited in claim 4, wherein the compute instance is disconnected from a publicly accessible network, and wherein the one or more networks comprise one or more private networks.

6. The method as recited in claim 4, further comprising:
sending a set of task execution documents from the task execution service to a document cache external to the task execution service, wherein the task execution document sent to the compute instance is derived from the set of task execution documents in the document cache.

7. The method as recited in claim 4, further comprising:
sending the task execution document from the compute instance to additional agent software of one or more additional compute instances, wherein execution of the one or more tasks is initiated on the one or more additional compute instances by the additional agent software based at least in part on the task execution document.

8. The method as recited in claim 4, further comprising:
generating a modified task execution document based at least in part on the execution of the one or more tasks on the compute instance; and
submitting the modified task execution document to the task execution service, wherein the modified task execution document is sent from the task execution service to additional agent software of one or more additional compute instances, wherein execution of one or more additional tasks is initiated on the one or more additional compute instances by the additional agent software based at least in part on the modified task execution document.

9. The method as recited in claim 4, further comprising:
sending an additional task execution document from the task execution service to the agent software of the compute instance, wherein execution of one or more additional tasks is initiated on the compute instance by the agent software based at least in part on the additional task execution document.

10. A non-transitory computer-readable storage medium storing program instructions that, if executed, perform:
determining that a task execution service is offline or unreachable by a computing device, wherein agent software of a compute instance is executable to receive task execution documents from the task execution service and initiate local task execution on the compute instance based at least in part on the task execution documents;
establishing a connection between a task execution interface on the computing device and the agent software of the compute instance over one or more networks, wherein the connection between the task execution interface and the agent software of the compute instance is established without invoking the task execution service;
sending, in response to the determining that the task execution service is offline or unreachable, a task execution document from the task execution interface on the computing device to the agent software of the compute instance, via the connection over the one or more networks, wherein the task execution service is bypassed in sending the task execution document by the task execution interface to the compute instance, and wherein execution of one or more tasks is initiated on the compute instance by the agent software based at least in part on the task execution document; and
receiving, at the task execution interface from the agent software of the compute instance, one or more status updates associated with the one or more tasks, wherein the task execution service is bypassed in receiving the one or more status updates.

11. The non-transitory computer-readable storage medium as recited in claim 10, wherein the compute instance is disconnected from a publicly accessible network, and wherein the one or more networks comprise one or more private networks.

12. The non-transitory computer-readable storage medium as recited in claim 10, wherein the program instructions are further computer-executable to perform:
sending a set of task execution documents from the task execution service to a local cache associated with the computing device, wherein the task execution document sent to the compute instance is derived from the set of task execution documents in the local cache.

13. The non-transitory computer-readable storage medium as recited in claim 10, wherein the program instructions are further computer-executable to perform:
sending the task execution document from the compute instance to additional agent software of one or more additional compute instances, wherein execution of the one or more tasks is initiated on the one or more additional compute instances by the additional agent software based at least in part on the task execution document.

14. The non-transitory computer-readable storage medium as recited in claim 10, wherein the program instructions are further computer-executable to perform:
generating a modified task execution document based at least in part on the execution of the one or more tasks on the compute instance; and
submitting the modified task execution document from the computing device to the task execution service, wherein the modified task execution document is sent from the task execution service to additional agent software of one or more additional compute instances, wherein execution of one or more additional tasks is initiated on the one or more additional compute instances by the additional agent software based at least in part on the modified task execution document.

15. The non-transitory computer-readable storage medium as recited in claim 10, wherein the program instructions are further computer-executable to perform:
sending an additional task execution document from the task execution service to the agent software of the compute instance, wherein execution of one or more additional tasks is initiated on the compute instance by the agent software based at least in part on the additional task execution document.

16. The non-transitory computer-readable storage medium as recited in claim 10, wherein the compute instance is provided by a multi-tenant provider network comprising a plurality of available compute instances.

* * * * *